Oct. 25, 1955 H. E. SHARPE 2,721,906

COMBINED MODULATED GROOVE AND MAGNETIC SOUND RECORDING

Filed July 16, 1952

Henry E. Sharpe INVENTOR.

United States Patent Office 2,721,906
Patented Oct. 25, 1955

2,721,906

COMBINED MODULATED GROOVE AND MAGNETIC SOUND RECORDING

Henry E. Sharpe, Chatham, N. J.

Application July 16, 1952, Serial No. 299,074

1 Claim. (Cl. 179—100.2)

This invention relates to sound recording and reproducing, and more particularly relates to a dual system which is adapted to magnetically record sound on and reproduce sound from a grooved record disc carrying the sound track on the surface of the disc, and which is also adapted to reproduce conventional records in which the sound track constitutes modulations in the groove of the record.

The primary object of this invention is to furnish a simple and inexpensive combination recorder and reproducer which will record and play back disc records magnetically and which will also reproduce conventional phonograph records.

A further object of this invention is to furnish a form of disc recording which can be operated by anyone, with satisfactory results.

A further objective of this invention is to embody advantageous features of wire and tape recording in a system of disc recording and at the same time eliminate certain objectionable features of wire and tape recording.

A further objective of this invention is to furnish a simple and inexpensive recording and reproducing machine which is suitable for use as a dictating machine.

A feature of this invention is a non-magnetic grooved sound record in disc form carrying on its surface a spiral sound track of magnetizable metal.

Another feature of this invention is a non-magnetic grooved sound record in disc form, the surface of which is coated with a magnetic material in a binder, for example, iron oxide in a resin binder.

Another feature of this invention is the use of a spiral groove in the surface of a magnetic sound record disc to guide the recording and reproducing head around the sound track and to separate the convolutions of the sound track.

Another feature of this invention is the use of shields between the gap of the electromagnet in the recording and reproducing head and the convolutions in the record track immediately adjacent to the particular convolution of the sound track in use.

Another feature of this invention is the use of dual recording and reproducing heads for use respectively with magnetic records and with records carrying a modulated sound groove.

Another feature of this invention is the use of magnetic records which are adapted to be played in sequence with the conventional types of automatic record changing equipment when using a special head forming part of this invention.

GENERAL DESCRIPTION

This invention covers a combination record player and recorder designed to play conventional disc phonograph records in the usual fashion and to record on and play back special magnetic records. The invention also covers two types of magnetic disc records, one of which carries a sound track consisting of a magnetic material in a plastic or composition binder while the other carries a sound track of magnetizable metal. The invention likewise covers a special recording and reproducing head designed to be connected to the record player and recorder and to operate on either of the two forms of magnetic record. Other features of the invention will also be referred to in this disclosure.

Referring to the attached sheet of drawings:

Figs. 1, 2 and 3 each illustrates a greatly enlarged partial cross-section of the end view of the head used for magnetic recording and reproducing in operative relation to a partial cross-section of a magnetic record. Each of these illustrations shows the electromagnet with a combination guide and shield member flanking the electromagnet on either side.

Figs. 4, 5 and 6 each illustrates a greatly enlarged partial side view of the head used for magnetic recording and reproducing. These three drawings illustrate particularly three different conformations of guide and shield members.

Fig. 7 illustrates a side view of a detachable head suitable for use with the tone arm shown in Fig. 10. The head illustrated is for use in playing conventional phonograph records in which a modulated groove constitutes the sound track, and accordingly shows the usual stylus at the tip of the head.

Fig. 8 also illustrates a side view of a detachable head suitable for use with the tone arm shown in Fig. 10. The head illustrated is for use in recording and reproducing magnetic records and an electromagnet is therefore shown in outline at the tip of the head.

Figure 1:
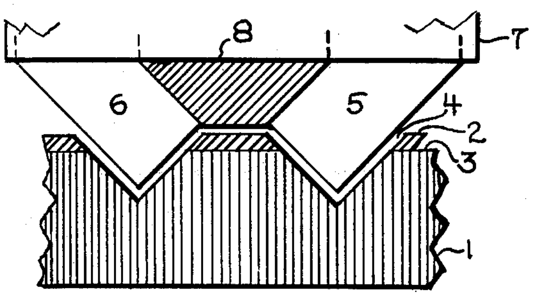
Figure 2:
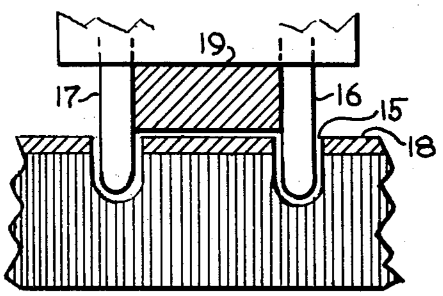
Figure 3:
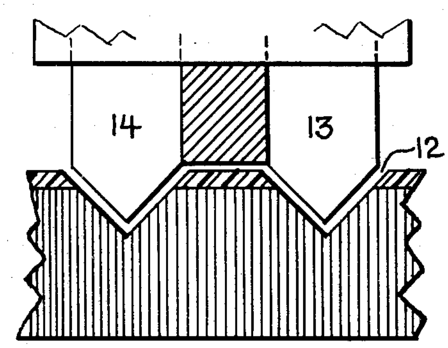
Figure 4:
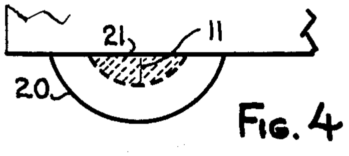
Figure 5:
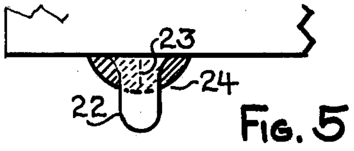
Figure 6:
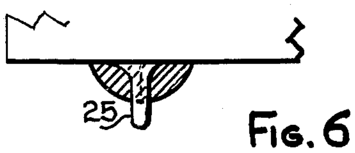

It should be particularly noted that Figs. 1, 2 and 3 are drawn to a greatly enlarged scale while Figs. 4, 5 and 6 are drawn to another and smaller scale and Figs. 7, 8, 9 and 10 are on still a different and smaller scale.

*The magnetic record*

Three forms of a novel magnetic record 1 are illustrated in greatly enlarged cross-section in Figs. 1, 2 and 3 of the attached drawing, and since Figs. 1, 2 and 3 all show different forms of the same or similar elements reference will be made principally to Fig. 1. It should be noted at this point, however, that while a metallic coating is illustrated in Figs. 1 and 2 and a plastic or composition coating is illustrated in Fig. 3 (to represent the plastic or composition binder carrying magnetic material) it is to be understood that either a metallic or a composition coating may be applied to any or all of the three forms of record illustrated.

This type of magnetic record would have the general appearance of the conventional phonograph disc, but instead of carrying a sound track comprised of modulations in the groove of the record the sound would be magnetically recorded on a coating 2 carried on the surface 3 of the record base lying between the convolutions of a spiral groove 4. It should be noted that in Fig. 1 part of the coating 2 has been cut away to show its relationship to the surface 3 of the base. The groove 4 is used merely to guide the head 7 around the spiral sound track 2. It should be particularly noted at this point that the groove 4 in the surface of the record constitutes a continuous spiral and that the land lying between the convolutions of the groove also constitutes a continuous spiral, each convolution of the land thus being separated from the adjoining convolutions of the land by a convolution of the groove.

In this disclosure the coating 2, in spiral form, will be referred to as the "sound track" even though it does not carry a permanent sound record comparable to the sound modulations impressed on the sides of the groove of a conventional phonograph record.

In either of the two forms of magnetic record here proposed the spiral groove would be either cut or molded in the surface of the record blank and a magnetic coating 2 would be then applied to the remaining surface 3 of the record, or the coating would be applied first and the spiral groove subsequently cut in the coated surface of the record.

The record base can be any non-magnetic material or composition having suitable characteristics, such as plastic (cellulose acetate is commonly used) or treated paper.

In one of the two forms of magnetic record here proposed the coating applied to the surface of the disc would be a magnetic material in a carrier corresponding to the coating currently in use for recording tape. In practice this frequently consists of a synthetic resin binder carrying a magnetic material such as "red" iron oxide powder. Coating a plastic or paper surface with a magnetic coating of this type is well known, and as such does not form a part of this invention.

However, instead of applying to the record surface a binder containing a magnetic material, an alternate form of magnetic sound track is proposed as part of this invention. Marked advances have been made recently in bonding metal of hair-line thickness to plastic. One outstanding example of the use of this technique is its application to the so-called "printed circuits" which are now just coming into wide commercial use. It is therefore proposed to make a magnetic record by applying this new technique to record making by bonding a readily magnetizable metal to the surface of a disc made out of plastic or treated paper or other suitable non-magnetic material.

The spiral groove 4 can be molded or cut in the surface 3 of disc 1 before the metallic sound track 2 is applied to the surface of the disc, or the entire surface 3 of the disc 1 can be given a metallic coating and the groove 4 cut later. Since the land 2 between the convolutions of the spiral groove also forms a continuous spiral, the resulting metallic surfacing will thus be in the form of a fine-line continuous spiral suitable for magnetic recording. Since this metallic spiral of wire is carried by the base and consequently does not need to have tensile strength the metallic surfacing can be reduced in thickness so that it has less than the customary .004 of an inch thickness of recording wire and can more nearly approach the preferred .0006 of an inch thickness commonly used for coatings on recording tape, thus giving it desired magnetic recording characteristics which cannot be achieved in ordinary recording wire. In this connection it should also be noted that since the convolutions of the metallic sound track 2 are separated by the groove 4 the "printing effect," echo and cross-talk which are problems in wire recording and to a lesser degree in tape recording are eliminated.

It should be noted that since the groove 4 does not have to carry any signal modulations in this type of record it can be of any depth or width or contour best suited to carrying the guides 5 and 6 of the recording and reproducing head 7 shown in Fig. 1, which will be later referred to. Figs. 2 and 3 also illustrate different forms of groove and land contours in greatly enlarged cross-section. The groove must of course be wide enough to avoid drag on the guides 5 and 6 and deep enough so that the guides will not jump the groove, but even this last problem is not as serious in this system of recording since there are no sound track modulations in the groove as there are in the conventional record to subject the head to movement which at times is violent enough to throw the stylus out of the groove. Similarly, the width of the land 2 or distance between the convolutions of the groove 4 can be varied at will to match the width of the electromagnet 8 used.

*The magnetic head*

Referring to Fig. 1, a new form of magnetic head 7 is needed to operate with either of the two forms of magnetic record disc 1 disclosed above. The magnetic head used with these discs would carry the usual electromagnet 8 arranged for longitudinal recording. In the simpler forms of combination record player and recorder this head would be used for both recording and reproducing.

The magnetic head 7 would be connected to and carried by the usual tone arm 9 (Fig. 10) constituting part of the combination record player and recorder 10. The tone arm and head are guided across the record by contact with the spiral record groove in the usual fashion.

Cross sections of an end view of three heads are shown greatly enlarged in Figs. 1, 2 and 3 in operative position upon the magnetic record, and schematic side views of three forms of head are illustrated in Figs. 4, 5 and 6. It should be pointed out in connection with Figs. 1, 2 and 3 that while, for clarity, a space is shown in the drawing between the bottom of the electromagnet 8 and the sound track 2, in actual operation the two must always be in the closest possible contact.

The preferred form of head, as illustrated in Figs. 1, 2 and 3 would carry two guides 5 and 6 which would track in the groove 4 on either side of the particular convolution of the sound track which the electromagnet was resting on at the time.

In addition to their function of guiding the head 7 and tone arm 9 (Fig. 10) of the record player and recorder, the guide members 5 and 6 (Fig. 1) would preferably be so shaped and positioned that they would shield or insulate the adjoining convolutions of the record track 2 from the magnetic flux existing at the gap of the electromagnet during recording, thus cutting down cross-talk between adjoining convolutions of the sound track to a minimum. In order to perform their function as shields, guide members 5 and 6 are placed on either side of and contiguous to the electromagnet 8 so as to form an effective barrier on each side of the gap of the electromagnet. In order to function as indicated these shields should be of non-magnetic material or can be of metallic composition in which case they would have to be electrically insulated from the electromagnet and then grounded so as to nullify the effect of undesired scattered magnetic flux.

Guide members are shown in Figs. 1, 2 and 3 with different conformations for the purpose of illustrating the large range of shapes available. If the performance requirements are not exacting and the shielding or insulating effect can be dispensed with, a single guide or tracking member can be used without departing from this invention. A single guide has not been separately illustrated since it could be identical in form and function with one of the double guides shown in Figs. 1, 2 and 3.

Since the bottom of the gap (which gap is shown as 11 in Fig. 4) between the poles of the electromagnet 8 must rest directly on the sound track 2 at all times, the electromagnet will carry the weight of the head and tone arm and the guide members 5 and 6 consequently need not touch the bottom of the groove 4. The guide members can therefore be shaped in any form which is best suited to carry out their dual function of guiding the head with the least possible drag on the record and shielding the adjoining sound tracks from the gap of the electromagnet.

Since it will normally be desirable to place on the record as many grooves per inch as possible, the critical factors in the design may well be the width of the sound track 2 and the width of the electromagnet 8 at the poles, viz., at the bottom of the electromagnet. Since the magnetic track produced by a head is normally only slightly wider than the head itself the groove and shield combination here proposed will make possible the use of the narrowest electromagnet and land which design factors will permit while still effectively blocking cross-talk from adjoining sound tracks.

Various proposals are here made for obtaining optimum spacing for the sound track 2 or the electromagnet 8 or both of them. Fig. 3 shows a conventional V-shape record cut 12, with guide and shield members 13 and 14 to fit. Fig. 2 shows a record with a narrow curved groove 15 with narrow guide and shield members 16 and 17 and wider land areas 18 between the convolutions of the groove, which makes possible the use of a wider electromagnet 19 than in Fig. 3 without reducing the total number of grooves on the record. Fig. 1 shows an electromagnet 8 which is tapered at the poles, viz. (at the bottom of the electromagnet) with guides 5 and 6 conforming to the shape of the electromagnet. This last form has the advantage that it would permit the use of an electromagnet that is even wider than the width of the land except at the poles, and without reducing the number of grooves per inch. Numerous variations on these designs can be made without departing from the scope of this invention.

Figs. 4, 5 and 6 show partial schematic side views of three forms of head and illustrate particularly three different types of guides. In Fig. 4 the guide 20 is of the same general contour as the electromagnet 21 but larger, and has the advantage that it would thus shield the entire exposed surface of the electromagnet from the adjoining sound tracks. Because of its size this form might, however, have a tendency to drag in the groove and the guide 22 in Fig. 5 is of somewhat narrower contour to avoid this possible difficulty while wide enough to shield the gap 23 of the electromagnet 24. The guide 25 shown in Fig. 6 would have little shielding value but would be adequate as a guide. It should be understood that other shapes of guides and shields can be used without departing from the scope of this invention.

*The record player and recorder*

Since this invention contemplates the use of two types of records and two corresponding types of heads on the single record player and recorder it is desirable that the two heads be readily interchangeable for convenience.

This can be accomplished in either of two ways. The two heads can be made up separately as shown (side view) in Figs. 7 and 8 and be designed to plug into the tone arm 9 (Fig. 10) of the record player and recorder 10 or a combination head as shown (side view) in Fig. 9 can be used which can remain attached to the tone arm and be rotated to bring either the stylus for the conventional records or the electromagnet for the magnetic records into playing position on the appropriate record.

Figure 7:

Going back to Fig. 7, this figure shows a separate head for use with conventional modulated groove records and a stylus is accordingly shown at the tip of the head. At the other end of the head one of the two prongs necessary for plugging the head into the contacts 26 of the tone arm 9 (Fig. 10) is shown, the other would not be visible in this view. This head would be used for reproducing only.

Figure 8:

Fig. 8 shows a separate head for use with the two types of magnetic record forming a part of this invention and an electromagnet is therefore illustrated at the tip of the head. As in Fig. 7 one of a pair of connecting prongs is shown at the other end of the head. This head would be used for both recording and reproducing.

Figure 9:
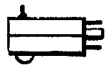
Fig. 9 illustrates, in side view, a combination head which could be used with a tone arm of the type shown in Fig. 10 if the connections for the tone arm were to be slightly modified over those shown. This head carries a stylus for conventional records at the top and an electromagnet for magnetic records at the bottom, either of which would be brought into play by rotating the head.
Figure 10:
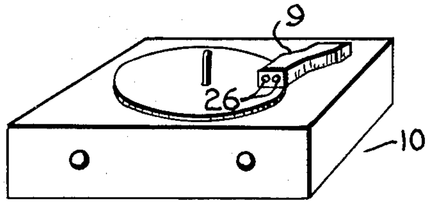
Fig. 10 illustrates an exterior view of a record player and recorder to show particularly the relation of the tone arm to the turntable. The tone arm illustrated is designed to carry a detachable head and two connections for receiving a two prong plug-in head are shown on the end of the tone arm.

It should be pointed out in connection with the combination head shown in Fig. 9 that the contacts 26 of the tone arm 9 (Fig. 10) would have to be modified slightly to accommodate this type of head since, as indicated above, the connection on the head is illustrated as a rotating connection.

In using a stylus on a conventional modulated groove record very light contact between the stylus and the record is normally desired. On the other hand it is important that very close contact be maintained at all times between the poles of the electromagnet and the sound track in magnetic operation and this would normally require that the head be reasonably heavy in order to assure this contact and avoid any tendency to bounce and thus break the contact. Consequently, in order to get the desired pressure in each instance, the use of two plug-in heads rather than a combined head would appear to be the preferred solution to the dual head problem. If a combined head of the type shown in Fig. 9 is used, a tone arm with a variable counterbalance would probably be necessary for best operation.

The remaining features of the record player and recorder are well known and do not form a part of this invention.

Provision for erasing the magnetic records will of course have to be provided, but erasing equipment is also well known and can be provided as a separate unit, and it consequently does not form a part of this invention.

While an automatic record changer is not a part of this invention, it should be pointed out that the conventional type of automatic record changer can be used with the record player and recorder here disclosed since the proposed magnetic records would have the same general formation as conventional records and would carry a similar tracking groove. The head designed for use with these records will also operate with such a changer. This factor greatly increases the potential usefulness of the invention since the length of the recording is not limited by the length of the record.

What I claim is:

In combination, a sound record player and recorder, a tone arm forming an operative part thereof, a reversible dual head forming an integral part of such tone arm and which carries on one side thereof a conventional stylus and on the other side thereof an electromagnet flanked on either side by a combination guide and shield member which is narrow in relation to the width of the electromagnet and is set at right angles to the slot in the base of the electromagnet, a conventional sound record with a sound track comprising a modulated groove of spiral form cut in the surface of the record which is adapted to cooperate with the stylus of the first side of such head, a second record carrying a magnetizable track of spiral form on the surface thereof the convolutions of which are separated by a spiral guide groove which is narrow in relation to the magnetizable track and which is adapted to so cooperate with the second side of such head that when the electromagnet is positioned to record and reproduce longitudinally resting on the surface of the magnetizable track the combination guide-shields will ride in the narrow guide grooves on either side of the particular section of track in use but without touching the bottom of such grooves.

References Cited in the file of this patent

UNITED STATES PATENTS

| | | |
|---|---|---|
| 2,361,752 | Eilenberger | Nov. 30, 1937 |
| 2,381,463 | Potter | Aug. 7, 1945 |

FOREIGN PATENTS

| | | |
|---|---|---|
| 512,766 | Great Britain | Nov. 30, 1937 |